United States Patent [19]

Slovinsky

[11] 4,269,717
[45] May 26, 1981

[54] BOILER ADDITIVES FOR OXYGEN SCAVENGING

[75] Inventor: Manuel Slovinsky, Woodridge, Ill.

[73] Assignee: Nalco Chemical Company, Oak Brook, Ill.

[21] Appl. No.: 194,349

[22] Filed: Oct. 6, 1980

Related U.S. Application Data

[63] Continuation-in-part of Ser. No. 140,965, Apr. 17, 1980, abandoned, which is a continuation-in-part of Ser. No. 46,121, Jun. 6, 1979, abandoned.

[51] Int. Cl.$^3$ ............................ C02F 1/20; C02F 1/70
[52] U.S. Cl. .................................... 210/750; 210/757; 252/188; 252/392; 252/393; 422/16
[58] Field of Search ............... 210/696, 749, 750, 763, 210/757, 718; 252/392, 393, 403, 404, 188; 260/554; 422/16; 423/269, 407

[56] References Cited

U.S. PATENT DOCUMENTS

| 2,640,831 | 6/1953 | Buckley et al. | 260/554 |
| 3,258,485 | 6/1966 | Argyle | 260/554 |
| 3,551,349 | 12/1970 | Kallfass | 252/393 |
| 3,843,547 | 10/1974 | Kaufman | 252/392 |
| 4,022,711 | 5/1977 | Noack | 252/188 |
| 4,022,712 | 5/1977 | Noack | 252/188 |
| 4,124,500 | 11/1978 | Arghiropoulos et al. | 210/757 |

FOREIGN PATENT DOCUMENTS

2112398 9/1972 Fed. Rep. of Germany ........... 260/554

Primary Examiner—Peter A. Hruskoci
Attorney, Agent, or Firm—Hosier, Niro & Daleiden

[57] ABSTRACT

A method of removing dissolved oxygen from boiler water which comprises adding to the water an oxygen scavenging amount of carbohydrazide.

6 Claims, 3 Drawing Figures

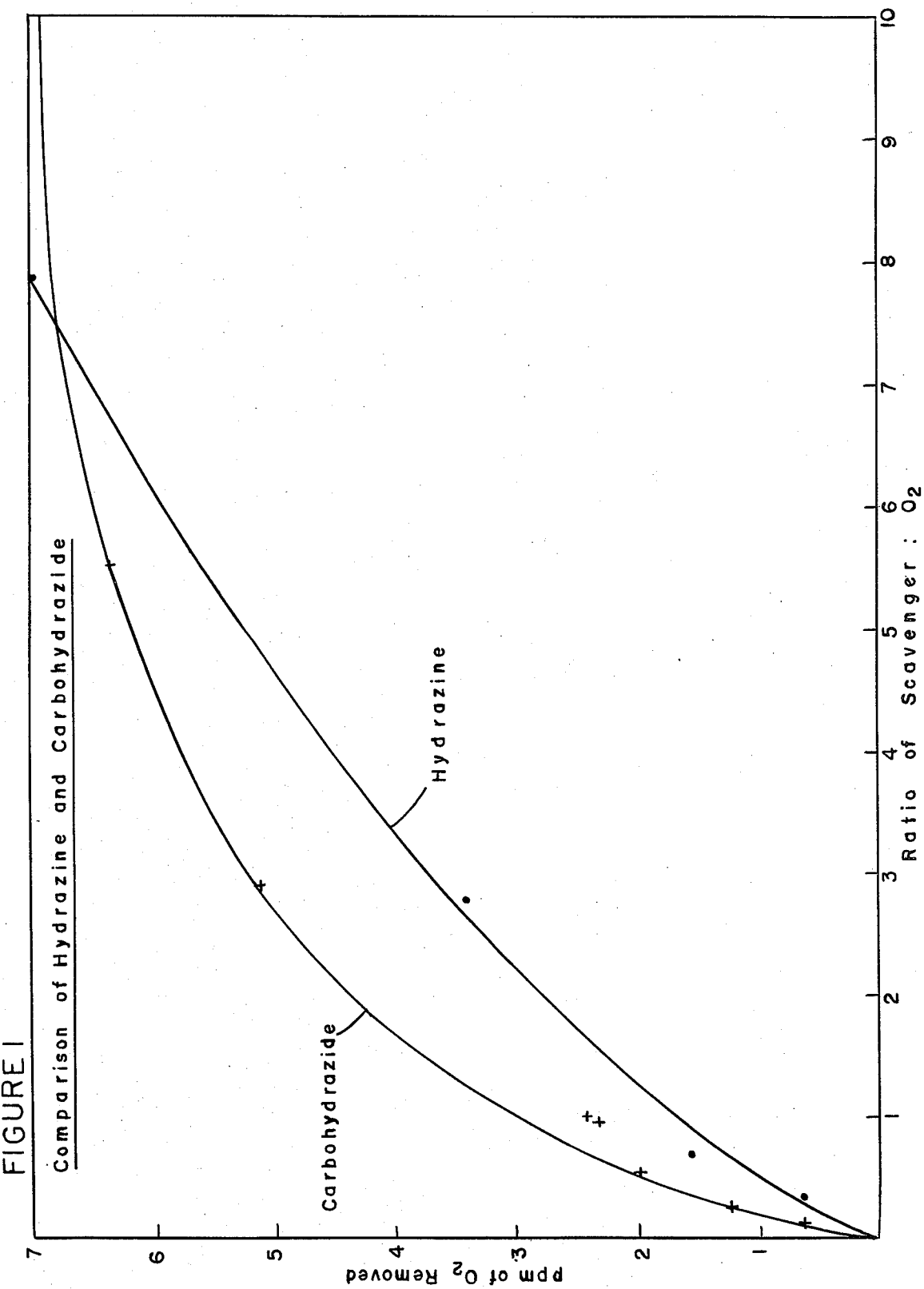

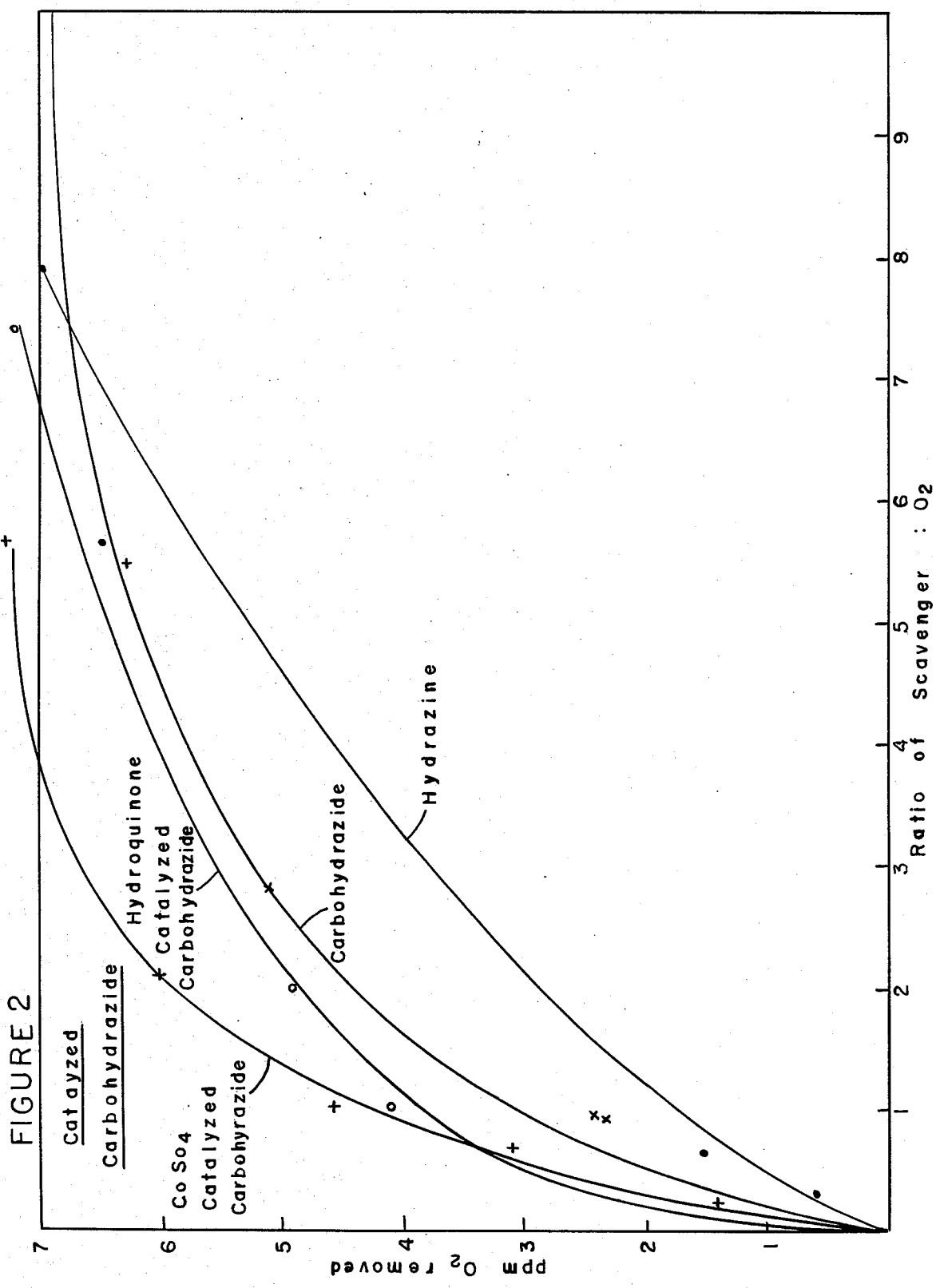

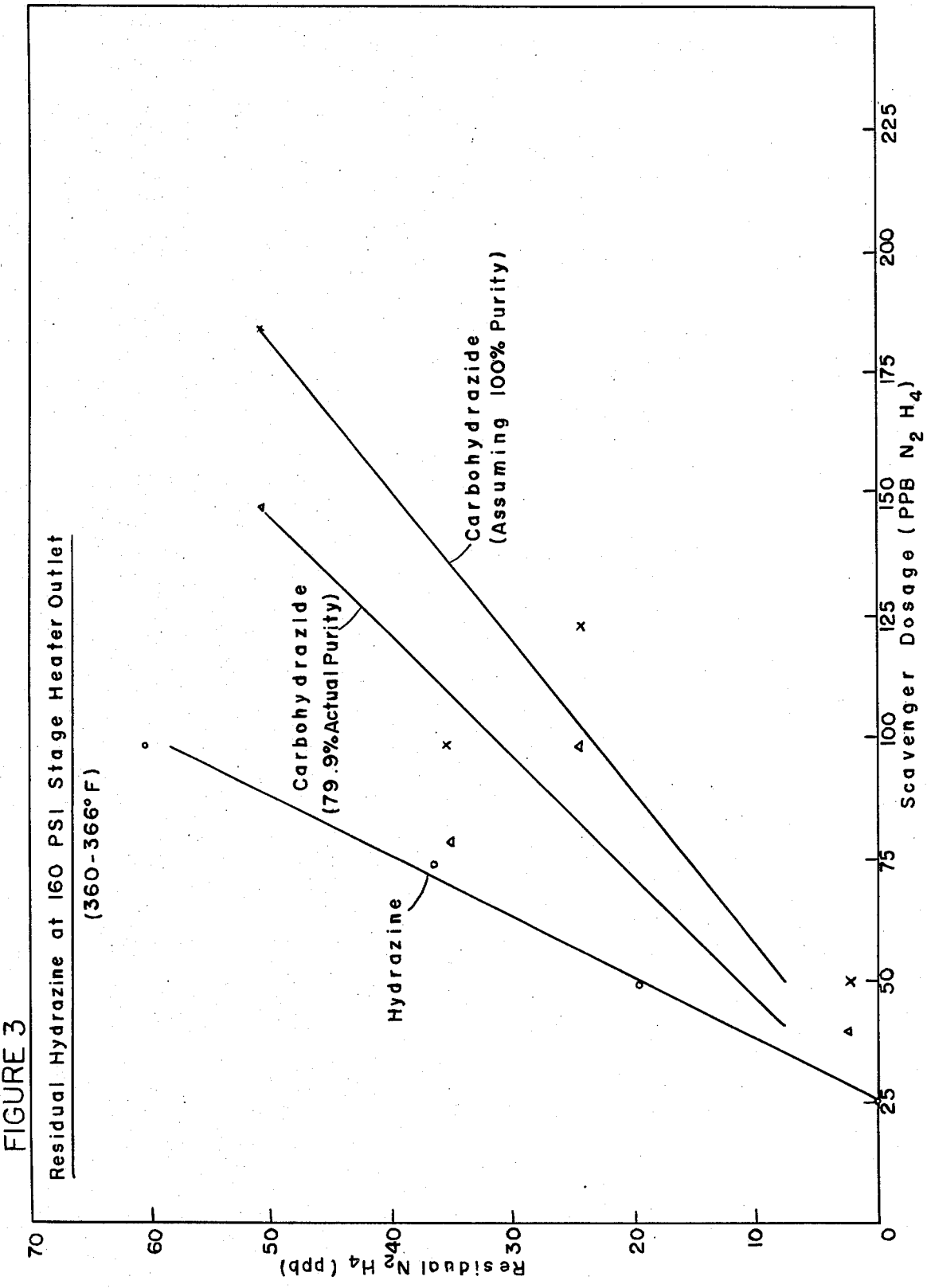

BOILER ADDITIVES FOR OXYGEN SCAVENGING

This is a continuation-in-part of application Ser. No. 140,965 filed Apr. 17, 1980 now abandoned which in turn is a continuation-in-part of application Ser. No. 46,121 filed June 6, 1979 now abandoned.

INTRODUCTION

Efficient operation of boilers and other steam-run equipment requires chemical treatment of feed water to control corrosion. Corrosion in such systems generally arises as a result of oxygen attack of steel in water supply equipment, pre-boiler systems, boilers and condensate return lines. Unfortunately, oxygen attack of steel is accelerated by the unavoidably high temperatures found in boiler equipment. Since acid pH's also accelerate corrosion, most boiler systems are run at alkaline pH's.

In most modern boiler systems, dissolved oxygen is handled by first mechanically removing most of the dissolved oxygen and then chemically scavenging the remainder. The mechanical degasification is typically carried out with vacuum degasifiers which will reduce oxygen levels to less than 0.5-1.0 mg/l or with deaerating heaters, which will reduce oxygen concentrations to the range of 0.005-0.01 mg/l.

Chemical scavenging of the remaining dissolved oxygen is widely accomplished by treating the water with hydrazine. See, for example, the Kirk-Othmer Encyclopedia of Chemical Technology, Second Edition, Interscience Publishers, Volume II, page 187. As explained in Kirk-Othmer, hydrazine efficiently eliminates the residual oxygen by reacting with the oxygen to give water and gaseous nitrogen. In addition, hydrazine is a good metal passivator since it forms and maintains an adherent protective layer of magnetite over iron surfaces.

Unfortunately, however, it has become widely recognized that hydrazine is an extremely toxic chemical. As a result, it is likely that worker exposure to this compound will be subjected to extremely severe tolerances by governmental occupational health agencies. It is therefore desirable to provide alternate boiler water treatment chemicals which are generally free of the dangers inherent in the use of hydrazine, but which effectively scavenge oxygen and passivate steel surfaces under typical boiler conditions.

THE INVENTION

The invention is directed generally to controlling corrosion in boiler systems and more particularly to treating boiler water to remove dissolved oxygen and to passivate metal surfaces.

In one important embodiment, the present invention provides a method of removing dissolved oxygen from boiler water by adding to the water an oxygen scavenging amount of carbonhydrazide (also referred to as NDAU or N, N' diaminourea). Since carbohdrazide is a high melting solid (m.p. 157°–158° C.) which is freely soluble in water, the carbohydrazide may be used in either dry powdered form or in solution form.

Although the carbohydrazide may be added to the boiler system at any point, it is most efficient to treat the boiler feedwater, preferably as it comes from the degasifier. Residence times prior to steam formation should be maximized to obtain maximum corrosion protection. While the carbohydrazide will control corrosion even if residence times are as low as 2–3 minutes, residence times of 15–20 minutes or more are preferred.

The amount of carbohydrazide required to effectively scavenge oxygen from the boiler water is dependent upon the amount of oxygen actually present therein. It is generally desirable that at least 0.5 moles of carbohydrazide be used per mole of oxygen. These minimum levels of carbohydrazide will have the added benefit of effectively passivating metal surfaces. Of course, levels of carbohydrazide considerably in excess of 0.5 moles per mole of oxygen may be required, particularly for treating boiler water under static storage conditions. Under such static conditions, for example, treatment levels of 160 moles or more of carbohydrazide per mole of oxygen have proven effective in controlling corrosion.

Carbohydrazide is an effective oxygen scavenger and metal passivator over the entire range of temperatures to which boiler water is generally subjected. Typically, these temperatures will lie in the range of 190°–350° F.

While it is well known that each molecule of carbohydrazide is capable of being hydrolyzed to 2 molecules of hydrazine, the extent of hydrolysis under typical boiler conditions is very minor. This fact has been illustrated in the examples below which further demonstrate that carbohydrazide is an effective oxygen scavenger and metal passivator in its own right.

While carbohydrazide may be used alone in the present application, it is preferred that it be catalyzed. For this purpose, it is desirable to use catalysts which undergo oxidation-reduction reactions. For example, hydroquinone and other quinones can be used to catalyze the carbohydrazide since they are capable of undergoing oxidation-reduction reactions. When a quinone catalyst is used, the amount of quinone added in relation to the carbohydrazide should be in the range of 0.2 up to about 20% by weight of the carbohydrazide.

Another oxidation-reduction catalyst useful with carbohydrazide in the present application is cobalt, preferably in a stabilized form. The amount of cobalt used in relation to the carbohydrazide should be in the range of 0.2 to about 20% by weight. Typical useful stabilized cobalt complexes are described in the following U.S. Pat. Nos., which are hereby incorporated by reference: 4,012,195; 4,022,711; 4,022,712; 4,026,664; and, 4,096,090.

To illustrate the invention, the following examples are presented.

EXAMPLE 1

A small laboratory boiler was used to screen a number of potential oxygen scavengers. Oxygen saturated feed water which contained sodium hydroxide was used as the feed. The residence time for the treatment chemical was approximately 11 minutes. The boiler water temperature was maintained at between 200°–220° F. In these tests, 2% hydroquinone was used as the catalyst. Results are set forth below in Table I.

TABLE I

| | INITIAL SCREENING AT 200-220° F. | | | |
|---|---|---|---|---|
| Additive | Dosage (ppb) | pH | Initial $O_2$ (ppb) | Final $O_2$ (ppb) |
| (35% $N_2H_4$) | 400 | 10.5 | 40 | 5 |
| | 500 | 9.75 | 40 | 25 |
| Co Catalyzed $Na_2SO_3$ | 400 | 9.65 | 40 | 0 |
| $Na_2SO_3$ | 400 | 9.65 | 40 | .005 |

TABLE I-continued

| Additive | INITIAL SCREENING AT 200-220° F. | | | |
|---|---|---|---|---|
| | Dosage (ppb) | pH | Initial O$_2$ (ppb) | Final O$_2$ (ppb) |
| Hydrazine sulfate | 500 | 10.5 | 40 | 10 |

EXAMPLE 2

A second more extensive group of potential oxygen scavengers were compared, again using a small laboratory boiler and oxygen saturated feed water containing sodium hydroxide. The results obtained are set forth below in Table II. Table II indicates that the following compounds showed activity comparable to hydrazine: hydrazine sulfate, N,N' diaminourea, disodium, dihydrazodicarboxylate, and hydrazine sulfite. The hydrazine salts among this group are no less toxic than hydrazine and therefore were eliminated from further study. Of the remaining two compounds, the carbohydrazide was the best scavenger. In addition, the carbohydrazide was preferred because it is a solid at room temperature and could therefore be used in dry formulations.

TABLE II

| | INITIAL SCREENING AT 227-239° F. | | | |
|---|---|---|---|---|
| Scavenger | Initial O$_2$ (ppb) | Final O$_2$ (ppb) | % O$_2$ Removal | Final N$_2$H$_4$ (ppb) |
| Hydrazine | 40 | 5 | 87.5 | 398 |
| Carbohydrazide | 40 | 5 | 87.5 | 33 |
| Hydrazinium sulfate | 40 | 5 | 87.5 | 435 |
| Oxalic dihydrazide | | Insoluble In Water | | |
| Polyacrylic hydrazide | 40 | 5 | 87.5 | 332 |
| Dialyzed hydrazide polymer LN-1287-130 | 40 | 40 | 0 | 16 |
| Formohydrazide | 40 | 40 | 0 | 30 |
| Diformohydrazide | 40 | 40 | 0 | trace |
| Dimethyldihydrazodicarboxylate | 40 | 20 | 50 | trace |
| Disodiumdihydrazodicarboxylate | 40 | 10 | 75 | 241 |
| Di (methylformal)-diazine | 40 | 40 | 0 | 244 |
| Tetraformaltrisazine | | Insoluble In Water | | |
| Hydrazinium sulfite | 40 | 5 | 75 | 265 |

EXAMPLE 3

The oxygen scavenging efficiency of carbohydrazide was compared to hydrazine in the next series of tests, with results reported in Table III below. A once-through experimental apparatus for simulating boiler water transport was utilized in this example. Water temperature in this example was maintained at about 227°-239° F. and pH at about 10.5.

The data generated in this example shows that oxygen removal levels achieved with a given concentration of hydrazine can generally be accomplished with half as much carbohydrazide. In addition, this data showed little difference between catalyzed and uncatalyzed scavengers.

TABLE III

| | CARBOHYDRAZIDE VS. HYDRAZINE IN OXYGEN REMOVAL | | | |
|---|---|---|---|---|
| Scavenger | ppm ppm O$_2$ | Initial O$_2$ (ppm) | Final O$_2$ (ppm) | % O$_2$ Removal |
| Catalyzed | 9.9/1 | 7.4 | 0.06 | 99.2 |

TABLE III-continued

| | CARBOHYDRAZIDE VS. HYDRAZINE IN OXYGEN REMOVAL | | | |
|---|---|---|---|---|
| Scavenger | ppm ppm O$_2$ | Initial O$_2$ (ppm) | Final O$_2$ (ppm) | % O$_2$ Removal |
| Hydrazine | 1.0/1 | 7.4 | 2.02 | 72.7 |
| (1% hydroquinone) | 0.1/1 | 7.4 | 7.12 | 3.8 |
| Hydrazine | 10.0/1 | 7.4 | 0.06 | 99.2 |
| | 0.9/1 | 7.4 | 2.28 | 70.5 |
| | 0.1/1 | 7.4 | 6.26 | 15.4 |
| Catalyzed | 5.0/1 | 7.7 | 0.10 | 98.7 |
| Carbohydrazide | 0.55/1 | 7.7 | 3.50 | 54.5 |
| (1% hydroquinone) | 0.05/1 | 7.7 | 6.70 | 13.0 |
| Carbohydrazide | 5.0/1 | 7.7 | 0.10 | 98.7 |
| | 0.5/1 | 7.7 | 3.28 | 57.4 |
| | 0.05/1 | 7.7 | 6.60 | 14.3 |

EXAMPLE 4

Another series of tests comparing hydrazine and carbohydrazide were carried out with the results presented in graphic form in FIG. 1. These tests were carried out at a temperature of 135° F. and a pH of 9.0 to prevent hydrolysis of the carbohydrazide.

The apparatus used including a reciprocating pump drawing water from a water reservoir and moving it through a heated copper coil at a rate of about 37 ml/minute. The coil was mounted in a cooling column and dissolved oxygen was measured at its outlet. The initial oxygen reading taken at this point for these tests was 7.7 ppm.

After the initial oxygen reading was taken, the scavenger being tested was injected into the feed line before the reciprocating pump. The resulting dissolved oxygen concentrations measured at the coil outlet are reported in FIG. 1. This Figure shows the carbohydrazide to be superior to the hydrazine at corresponding scavenger-:oxygen levels.

EXAMPLE 5

Commercial scale comparisons were made between carbohydrazide and hydrazine. The tests were run on a system including a deaerator which treats a mixture of feed water and condensate at 60 p.s.i. and 300°-310° F. before it is fed to a first stage heater at 160 p.s.i. and 360°-366° F. and a second stage heater at 400 p.s.i. and 446°-450° F. The second stage heater then feeds into three boilers: a combination boiler at 1,275 p.s.i., a first power boiler at 1,275 p.s.i. and a second power boiler at 400 p.s.i. The treatment chemicals were fed alternatively at the deaerator and just down line from it.

Sampling at various points in this system indicated that the carbohydrazide was comparable or superior to the hydrazine, at carbohydrazide levels half those of the hydrazine. In particular, sampling at 300° F. (just past the deaerator) showed results comparable with the hydrazine whereas sampling at 360° F. (just past first stage heater) and at 446° F. (just past second stage heater) indicated that the carbohydrazide scavenged the oxygen more efficiently than the hydrazine (carbohydrazide still at 50% of hydrazine level).

EXAMPLE 6

Metal passivation studies were undertaken using an experimental firerod boiler under the following test conditions:

600 p.s.i.
110,000 Btu/ft$^2$/hour
10 boiler water concentrations 48 hour test
Feedwater:
4 ppm Ca (as CaCO3)
2 ppm Mg (as CaCO3)
1 ppm SiO2 (as SiO2)
40 ppm M alkalinity (as CaCO3)
42.6 ppm Na2SO4 (as Na2SO4)
10 ppm NaCl (as NaCl)

A blank containing no oxygen scavenger was followed by test runs with hydrazine, carbohydrazide, and sodium sulfite. The appearance of the firerods after the test was compared and is reported in Table IV. This work showed the carbohydrazide to be the most effective metal passivator under the test conditions.

TABLE IV
METAL PASSIVATION IN EXPERIMENTAL FIREROD BOILER

| Test No. | Oxygen Scavenger | Dosage | Tube Rank* |
|---|---|---|---|
| 1 | Carbohydrazide | 1 ppm | 1 |
| 2 | Sulfite | 20–40 ppm residual | 2 |
| 3 | Hydrazine | 2 ppm | 3 |
| 4 | None | — | 4 |

*Tubes ranked by appearance of metal surface.

EXAMPLE 7

The effect of catalysts was examined in this series of tests, utilizing the apparatus described in Example 4. The results obtained, which are illustrated graphically in FIG. 2 showed that catalyzed carbohydrazide (catalyst level 1% of active) performed better than either carbohydrazide or hydrazine alone. In addition, cobalt catalyzed carbohydrazide performed generally better than hydroquinone catalyzed carbohydrazide.

EXAMPLE 8

Low temperature hydrolysis studies of carbohydrazide were carried out using reagent grade carbohydrazide containing approximately 2.7±0.1% hydrazine as an impurity. A 1,000 ppm carbohydrazide solution and a 100 ppm hydrazine solution were prepared with deaerated, deionized water. Half of the carbohydrazide solution was adjusted to pH 10.2 with sodium hydroxide and the other half was left at its original pH of 6.9. The solutions were poured into Nessler tubes to overflowing and sealed with stoppers fitted with hypodermic needles to allow pressure release with minimum air contact. Four samples of both of the carbohydrazide solutions and two samples of the hydrazine control were stored at varying temperatures for varying periods of time, all as reported in Table V below.

The hydrazine control showed a loss of approximately 10% of its initial concentration after 6 days, possibly due to oxidation, venting or reaction with the rubber stopper of the Nessler tube. Results for carbohydrazide at room temperature and 120° F. indicate that no hydrolysis occured at these temperatures. At 180° F. hydrolysis occured at a rate only 3% above the original free hydrazine level. Values did not vary significantly over the pH range of 7–10.

TABLE V
CARBOHYDRAZIDE LOW TEMPERATURE HYDROLYSIS

| Solution | pH | Temperature | Time | ppm Hydrazine | Percent Hydrolysis | Hydrazine By |
|---|---|---|---|---|---|---|
| 1,000 ppm Carbohydrazide | 6.9 | — | 0 | 19.0 | 2.7 | 0 |
| | | Room Temp. (77° F.) | 2 days | 19.7 | 2.8 | 0 |
| | | | 4 days | 19.1 | 2.7 | 0 |
| | | | 6 days | 18.7 | 2.6 | 0 |
| | | 120° F. | 2 days | 18.9 | 2.7 | 0 |
| | | | 4 days | 18.8 | 2.6 | 0 |
| | | | 6 days | 18.3 | 2.6 | 0 |
| | | 180° F. | 2 days | 28.4 | 4.0 | 1.3 |
| | | | 4 days | 35.4 | 5.0 | 2.3 |
| | | | 6 days | 40.2 | 5.7 | 3.0 |
| 1,000 ppm Carbohydrazide | 10.2 | — | 0 | 19.1 | 2.7 | 0 |
| | | Room Temp. (77° F.) | 2 days | 20.2 | 2.8 | 0 |
| | | | 4 days | 20.5 | 2.9 | 0.1 |
| | | | 6 days | 20.1 | 2.8 | 0 |
| | | 120° F. | 2 days | 20.0 | 2.8 | 0 |
| | | | 4 days | 19.8 | 2.8 | 0 |
| | | | 6 days | 19.3 | 2.7 | 0 |
| | | 180° F. | 2 days | 29.0 | 4.1 | 1.4 |
| | | | 4 days | 34.2 | 4.8 | 2.1 |
| | | | 6 days | 38.6 | 5.4 | 2.7 |
| 100 ppm Hydrazine | 10.25 | — | 0 | 97.4 | | |
| | | Room Temp. (77° F.) | 6 days | 89.8 | | |
| | | 120° F. | 6 days | 86.6 | | |
| | | 180° F. | 6 days | 87.6 | | |

EXAMPLE 9

High temperature hydrolysis studies were next carried out again using reagent grade carbohydrazide containing approximately 2% hydrazine as an impurity. The apparatus used in this work was the once-through experimental apparatus for simulating boiler water transport referred to in Example 2, with feedwater pH set at 8.0 and system pressure at 600 p.s.i.

Results for the high temperature hydrolysis study of carbohydrazide are tabulated in Table VI. These results show that hydrolysis at 220° F. and 282° F. is minimal and even at 340° F. through 400° F., hydrolysis is still not complete. Referring back to the results of Example 2, which are reported in Table II, carbohydrazide was shown to scavenge oxygen effectively at about 220° F. Since less than 7% hydrazine is found at this temperature in the present example, the oxygen scavenging achieved by the practice of the present invention must be due to the activity of a species other than hydrazine.

TABLE VI

CARBOHYDRAZIDE HIGH TEMPERATURE HYDROLYSIS

| Temperature (°F.) | Residence Time in Coil (Min.) | Final Hydrazine Level[1] (ppm) | Percent Hydrolysis[1,2] |
|---|---|---|---|
| 21 | 14.5 | 2 | 0 |
| 282 | 14.5 | 7 | 7.0 |
| 343 | 14.5 | 45 | 60.5 |
| 400 | 14.5 | 59 | 80.2 |
| 400 | 15.0 | 61 | 83.0 |

[1]Carbohydrazide was fed at 100 ppm; complete hydrolysis of the carbohydrazide would theoretically yield 71.1 ppm $N_2H_4$.

[2]Percent hydrolysis =
$$\left( \frac{\text{ppm final hydrazine} - 2 \text{ ppm free hydrazine}}{71.1 \text{ ppm total theoretical hydrazine}} \right) \times 100$$

EXAMPLE 10

The results of Example 9 suggest that since carbohydrazide hydrolysis is incomplete at 400° F., carbohydrazide residual hydrazine levels will be lower than those for straight hydrazine treatments (at a carbohydrazide to hydrazine ratio of 1:2). This predicted result was investigated in studies of residual hydrazine carried out at the commercial boiler site described in Example 5. Results at each of the three sample points referred to in that example (300° F., 360° F., and 450° F.) confirmed this expected result. The data obtained at the 360° F. sample point is typical of that obtained at the other sample point and is set forth in graphical form in FIG. 3. In connection with this figure, it is noted that the carbohydrazide used in this trial was actually 79.9% pure. When this lower purity is taken into account, residual hydrazine levels observed for carbohydrazide become approximately half those observed for hydrazine, regardless of temperature. Thus, it once again appears that carbohydrazide is far from completely hydrolyzed in the system and that hydrazine is probably not the scavenger species involved in removing dissolved oxygen from the boiler water system.

I claim:

1. A method of removing dissolved oxygen from boiler water having an alkaline pH which comprises adding to said boiler water an oxygen scavenging amount of carbohydrazide, said oxygen scavenging amount being at a level of a least 0.5 moles of carbohydrazide per mole of dissolved oxygen.

2. The method of claim 1 wherein the boiler water is subjected to deaeration to reduce the level of dissolved oxygen and the carbohydrazide is added to the boiler water after deaeration to remove remaining dissolved oxygen.

3. The method of claim 1 wherein the carbohydrazide is used with a catalyst capable of undergoing oxidation-reduction reactions.

4. The method of claim 3 wherein the catalyst is hydroquinone.

5. The method of claim 3 wherein the catalyst is cobalt.

6. The method of removing dissolved oxygen from boiler water having an alkaline pH and passivating boiler surfaces comprising adding to the boiler water at least 0.5 moles of carbohydrazide per mole of dissolved oxygen along with from 0.2 up to about 20% by weight based on carbohydrazide of a catalyst capable of undergoing oxidation-reduction reactions.

* * * * *

UNITED STATES PATENT AND TRADEMARK OFFICE
CERTIFICATE OF CORRECTION

PATENT NO. : 4,269,717

DATED : May 26, 1981

INVENTOR(S) : Manuel Slovinsky

It is certified that error appears in the above—identified patent and that said Letters Patent is hereby corrected as shown below:

In Column 4, table III, under heading final $O_2$ (ppm), the fourth numeral delete "2.28" and add -- 2.18 --.

In column 6, table V, under heading Percent Hydrolysis delete "Hydrolysis" and add -- Hydrazine --.

In column 7, table VI, under heading temperature ($^0F$), the first numeral delete "21" and add -- 221 --.

Signed and Sealed this

Fifteenth Day of September 1981

[SEAL]

Attest:

GERALD J. MOSSINGHOFF

Attesting Officer   Commissioner of Patents and Trademarks